US011880899B2

(12) United States Patent
Seagraves et al.

(10) Patent No.: US 11,880,899 B2
(45) Date of Patent: Jan. 23, 2024

(54) PROXIMITY-BASED SHARED TRANSPORTATION RESERVATIONS

(71) Applicant: Ford Motor Company, Dearborn, MI (US)

(72) Inventors: Jamel Seagraves, Campbell, CA (US); Chih-Wei Tang, Mountain View, CA (US); Sudipto Aich, Palo Alto, CA (US); Beaudry Kock, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 16/979,949

(22) PCT Filed: Mar. 19, 2018

(86) PCT No.: PCT/US2018/023175
§ 371 (c)(1),
(2) Date: Sep. 11, 2020

(87) PCT Pub. No.: WO2019/182559
PCT Pub. Date: Sep. 26, 2019

(65) Prior Publication Data
US 2021/0014678 A1 Jan. 14, 2021

(51) Int. Cl.
*G06Q 50/30* (2012.01)
*G06Q 10/02* (2012.01)
(Continued)

(52) U.S. Cl.
CPC ......... *G06Q 50/30* (2013.01); *G01C 21/3438* (2013.01); *G06Q 10/02* (2013.01); *H04W 12/64* (2021.01); *H04W 4/40* (2018.02)

(58) Field of Classification Search
CPC .... H04W 12/64; H04W 4/40; G01C 21/3438; G06Q 50/30; G06Q 10/02
See application file for complete search history.

(56) References Cited

U.S. PATENT DOCUMENTS 5,917,407 A 6/1999 Squire et al.
10,482,226 B1 * 11/2019 Konrardy ............ G06F 16/2455
(Continued)

FOREIGN PATENT DOCUMENTS

WO 2017/148291 A1 9/2017

OTHER PUBLICATIONS

Lomas, Natasha, "Didi adds Apple Pay support across core mobility services," TechCrunch.com, Sep. 15, 2017, https://techcrunch.com/2017/09/15/didi-adds-apple-pay-support-across-core-mobility-services/ (Year: 2017).*

(Continued)

*Primary Examiner* — Resha Desai
*Assistant Examiner* — Michelle E Carey
(74) *Attorney, Agent, or Firm* — Brandon Hicks; Eversheds Sutherland (US) LLP

(57) ABSTRACT

Various approaches allow for shared transportation reservations and related actions to be made based on a user's proximity to a shared transportation station. Data is received concerning the user's computing device, such as a vehicle, a mobile device, an internet-connected device, or a cellular network-connected device. Approaches can use a variety of data formats, including image data, location coordinates, or wirelessly-transmitted data. Based on such data and a criterion such as a threshold proximity to the station, the user's account status is determined and access to same authorized. Via the account, numerous actions may be taken, including automatically triggering a transport mode reservation or return, prompting the user to reserve or return the shared transportation, or debiting the user per a fee associated with the transportation reservation. Further, neural network techniques may be applied to train a model for generating related recommendations.

16 Claims, 8 Drawing Sheets

(51) Int. Cl.
*G01C 21/34* (2006.01)
*H04W 12/64* (2021.01)
*H04W 4/40* (2018.01)

(56) References Cited

U.S. PATENT DOCUMENTS

| | | | |
|---|---|---|---|
| 10,664,580 B2 | 5/2020 | Huang et al. | |
| 10,929,829 B1* | 2/2021 | Hazelwood | G06V 30/224 |
| 2010/0332268 A1 | 12/2010 | Ohmori et al. | |
| 2011/0010300 A1* | 1/2011 | Audet | G06Q 30/06 |
| | | | 705/307 |
| 2013/0246132 A1 | 9/2013 | Buie | |
| 2015/0348179 A1* | 12/2015 | Kamisawa | G08G 1/205 |
| | | | 705/5 |
| 2017/0206201 A1 | 7/2017 | Chidlovskii | |
| 2018/0096356 A1* | 4/2018 | Parekh | G06Q 20/3278 |
| 2018/0349590 A1 | 12/2018 | Huang et al. | |

OTHER PUBLICATIONS

International Search Report of the International Searching Authority for PCT/US2018/023175 dated Jun. 11, 2018.

* cited by examiner

PROXIMITY-BASED SHARED TRANSPORTATION RESERVATIONS

BACKGROUND

As cities become more complex and populations continue to grow and become more mobile, demand on transportation and related infrastructure is increased. And as lifestyles become increasingly dynamic, people and places are becoming more connected than ever before. People often need to travel within, and between, cities for various reasons such as for work, socializing, and recreation. The frequency and scheduling of travel may vary greatly as well, be it a daily commute, a scheduled event, or a spontaneous trip. Regardless of the distance, destination, or time of travel, people expect to have the freedom to move about and be at their desired location at a desired time. Transportation and mobility systems are fundamental in making such a lifestyle possible.

However, conventional means of transportation and mobility are no longer suitable to meet the resource constraints and other needs of present and future cities and their populations. For example, as people become more connected, there may often be influxes of traffic to a certain area due to large gatherings, such as for organized events, or due to spontaneous gatherings quickly galvanized through social media, among other phenomenon unique to modern societies. Transportation systems and modalities need to be robust enough to handle the changing demands, while working within the constraints of existing infrastructures. Yet as population grows, more land is used to build housing, office, and retail space to meet the demands of the increasing population. Less space may be available for parking, but there may be an increase in the number of cars. Such resource constraints mean that additional transportation and mobility technology must be designed and innovated upon for increased efficiency, providing dynamic services which meet the needs of present and future populations while reducing the resources required to do so.

In the current environmentally-conscious age, alternative modes of transportation in particular are desired. The alternative forms of transit help to reduce automotive-output pollution, while promoting fitness and avoiding costly expenditures on fuel. In urban and suburban areas alike, transportation mode sharing programs, such as bicycle (bike) sharing programs, have been implemented and are succeeding. Such programs, in essence, provide a rental or loan service whereby bicycles are made available for shared use to individuals on a short-term basis, often for a fee. Service subscriptions may be available. However, it can prove difficult to find a bicycle station, or at least a station where bicycles remain available—sometimes bikes may be gone by the time a potential rider reaches a station. Further, as use of the sharing service typically requires payment of a fee or at least a deposit, a potential rider often must remember to bring sufficient funds or a means of otherwise making the requisite payment.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In that vein, it should be understood that, for any process discussed herein, there can be additional, fewer, or alternative steps performed in similar or alternative orders, or in parallel, within the scope of the various embodiments.

Systems and methods in accordance with various embodiments of the present disclosure may overcome one or more of the aforementioned and other deficiencies experienced in conventional approaches to transportation reservations. In particular, various embodiments provide for automatically making a reservation for use of a transportation device (e.g., a bike or a car) based on a proximity of a user and/or a user computing device associated with the user to a transportation station. For example, in an embodiment, data can be received for a user such as image data that includes a representation of the user or data concerning a user's computing device, such as a vehicle with onboard computing capability, a mobile device, an internet-connected device, or a cellular network-connected device. The data can be obtained in a variety of formats, including, for example, image data obtained from a camera in communication with the user computing device, location coordinates such as Global Positioning System (GPS) navigation system data, or wirelessly-transmitted data such as wireless internet (WiFi) or cellular network data.

Based on such data and satisfaction of a criterion such as a threshold proximity to a shared-transportation station, the user's account status is determined and access to same can be authorized for registered users. Via the registered user's account, numerous actions may be taken, including automatically triggering a transport mode reservation or return event, confirming a prior reservation or return event, prompting the user to reserve or return the shared transportation, or debiting the user per a fee associated with the transportation reservation. In various embodiments, neural network and machine learning techniques may be applied to train a model for generating recommendations for shared-transport reservations or related events. Other applications, processes, and uses are presented below with respect to the various embodiments, each of which improves the operation and performance of the computing device(s) on which they are implemented. It should be noted that various other features and applications can be implemented based on, and thus practice, the above-described technology and presently-disclosed techniques.

Figure 1:
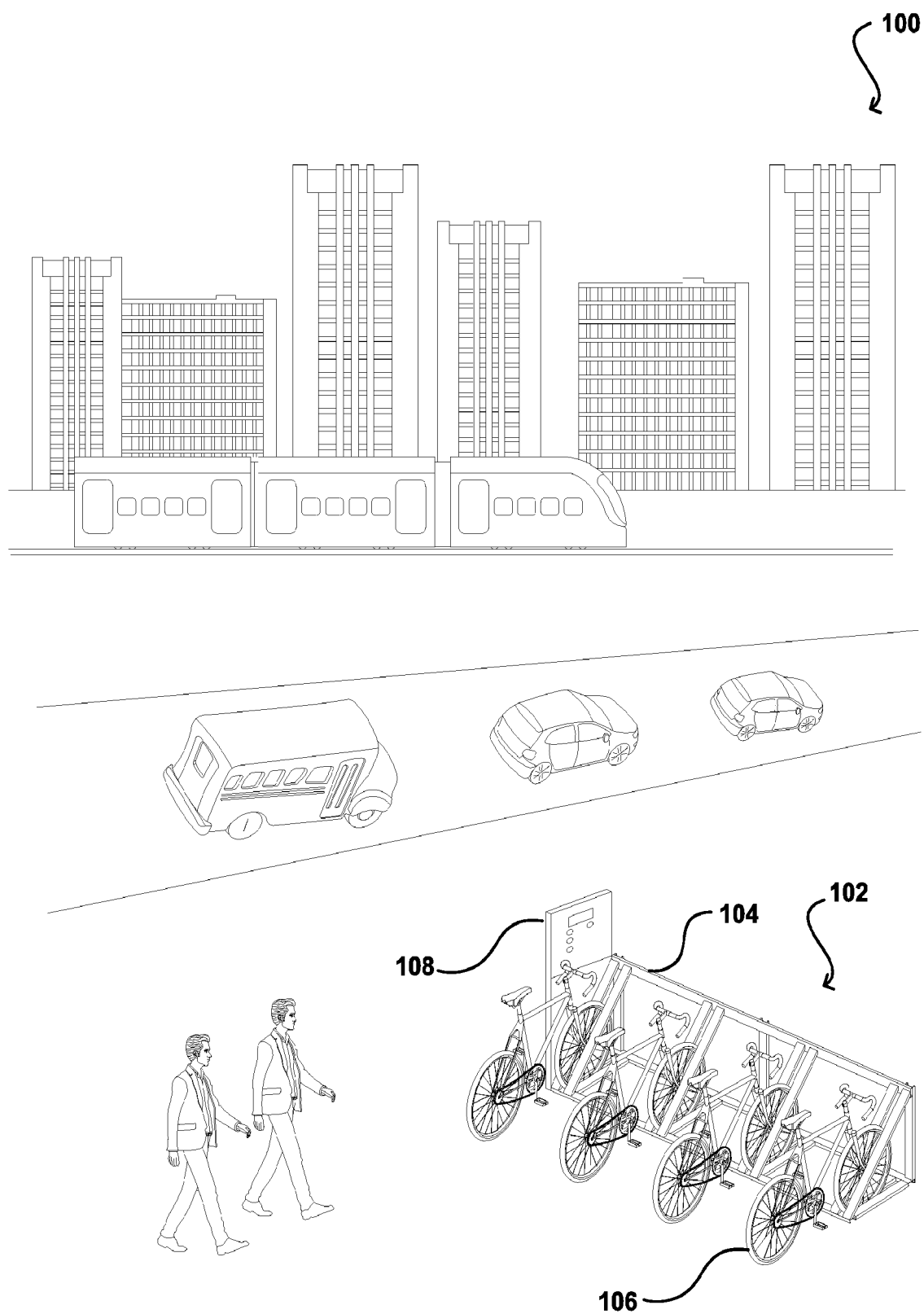
FIG. 1 illustrates an example environment in which present systems and methods may be implemented in accordance with various embodiments of the present disclosure.

FIG. 1 illustrates an example transportation landscape 100 in which the present systems and methods may be implemented, in accordance with various embodiments. As illustrated in FIG. 1, many types of modes of transportation and mobility may be available in cities large and small, often depending on certain characteristics of the city, such as population size, population distribution, and terrain, among others. Examples of modes of transportation and mobility may include personally-owned vehicles, public transportation systems such as buses and trains, walking, and biking. Cities may often have a primary mode of transportation or a combination of several modes.

Individual car ownership is common in sprawling cities where the population is relatively less dense. Such cities tend to have a less-developed public transportation system (e.g., only buses and perhaps commuter trains) due to the low utilization efficiencies. For example, the cost of developing, maintaining, and operating such systems may outweigh the benefit they provide to the community. In such cities, since locations of interest may be further apart, walking and biking may be less common as well. Thus, the population in those cities is heavily reliant on individual cars. Still, there may be certain times or locations that are prone to road congestion due to the number of cars on a given road or in the area, such as during typical work commuting hours known as "rush hour" and when there are special events that cause large groups of people to congregate in a small area, such as for a concert or sporting event or due to road construction and repair work. Additionally, individual cars are rarely used at full capacity, especially when used for work commutes, resulting in efficiency losses in terms of both space and energy.

Conversely, densely populated cities tend to have a more multi-modal mobility landscape. For example, in addition to individual cars, densely-populated cities also tend to have a more established public transportation system, and the population tends to rely more heavily on public transportation. Locations are likely to be closer together, and more people are likely to live close to bus stops, subway stations, and the like, making such mean of transportation useful and convenient. However, public transportation conventionally runs on fixed schedules and fixed routes. This means that people have to plan around the factors determining which destinations are convenient, and even consider such deciding where they want to live. For example, some buses only run during certain operating hours and are not available as an option during off hours. The inflexibility of conventional public transportation also affects businesses and real estate utilization. Businesses located close to subway stations or other public transportation access points may have increased foot traffic or patronage due to the convenience. Similarly, residential buildings that are close to such public transportation access points may also be more desirable at least to some. In effect, the fixed nature of conventional transportation coupled with the population's reliance on it may cause these densely-populated cities to become even more clustered around these access points, rather than evenly utilizing space across the city. Commuter trains provide a means for traveling within and between cities and are prevalent between cities with populations that may live in one city and work in another city or other have populations that frequently travel between the cities. However, like other forms of conventional public transportation, commuter trains typically run according to a set schedule between a limited number of stops.

Densely-populated cities may be conducive to walking, as destinations may often be within a short, walkable, distance. Walking also provides the added benefits of independence, energy conservation, and fitness gains. But cities and neighborhoods may vary significantly in pedestrian safety and ease. For example, well-lit sidewalks and other paved pedestrian paths may provide a better environment for pedestrians, and thus more people may consider walking as a practical form of travel. On the other hand, weather may also influence pedestrians; inclement weather can make walking impossible at times, or at least most unpleasant, even for a short distance. And there may be other circumstances that make walking particularly difficult, such as if a person is carrying large or heavy items or wearing uncomfortable shoes or if the destination is far away, among other situations. Thus, although walking may be an available form of mobility in certain types of environments, it certainly is difficult to rely upon it all of the time.

Similar to walking, bicycles provide an alternative to that allows people to travel relatively independently while conserving energy and gaining fitness benefits. Yet people may not have space to store a bicycle or may not use bicycles frequently enough to warrant owning one. As illustrated in FIG. 1, bike sharing has recently become a popular means of providing shared access to bicycles when needed. For example, a user can rent or borrow a bicycle from a bike station for a particular trip and return the bicycle to another bike station at, or near, his or her destination, or to the original bike station upon returning from the trip. Existing bicycle sharing systems 102 typically include a station 104 which holds a plurality of shared bikes 106. A user may interact with some form of kiosk 108 at the station 104 to rent or borrow one of the available bikes 106 if any are available. For example, the user may swipe a card (e.g., a credit card, a membership card, or an identification card) to unlock a bike 106. When a user is finished using a bike 106, he or she may return the bike by docking it onto a station 104.

Problematic situations commonly arise in which a user arrives at a shared bicycle station 104 with the intention of getting a bicycle 106, only to find that there are none available, thereby throwing a wrench into the user's plans. Similarly, a user may want to return a shared bike 106 to a station 104 when a destination is reached, only to find that the station 104 is full and has no docking spots available. Thus, the user may have to find another station 104, which may be farther away and without knowing if docking spots will be available at that station 104. Various embodiments of the present disclosure provide an intelligent shared transportation system 102 for making proximity-based reservations and taking other, related actions. And while the present disclosure is directed to technology for bicycle sharing systems and reference herein is made to bikes 106, the systems and methods herein are applicable as well to systems and methods for sharing any other sort of vehicle, including, but not limited to, scooters and other portable, personal transport devices.

Figure 2:
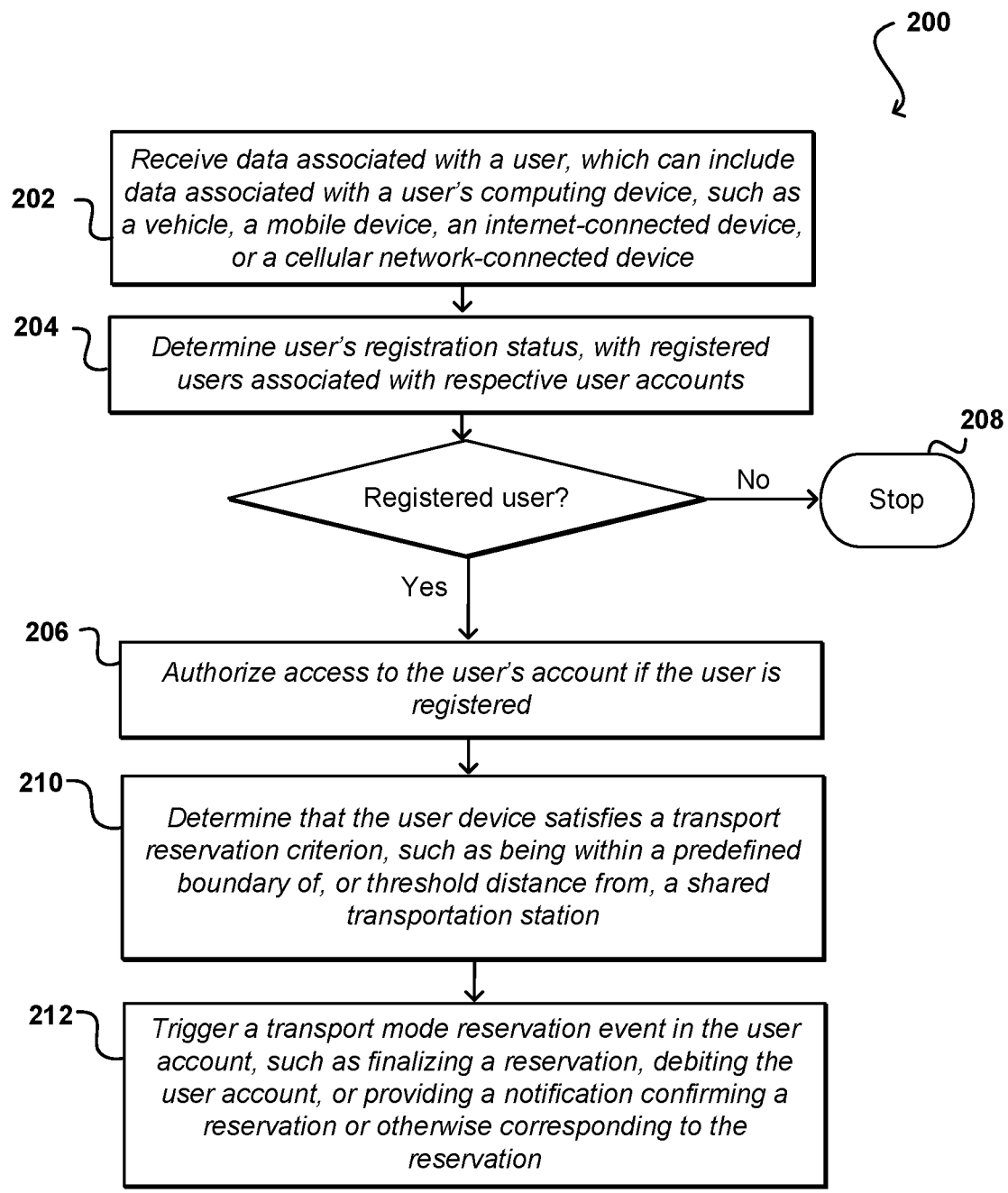
FIG. 2 illustrates the flow of a representative method for proximity-based transport mode reservations in accordance with various embodiments of the present disclosure.

FIG. 2 illustrates steps of an exemplary process 200 for shared transportation reservations and related actions based on a user's proximity to a shared transportation station in accordance with various embodiments. Again, for this and other processes discussed herein, there can be additional, fewer, or alternative, steps performed in similar or alternative steps, or in parallel, within the scope of the various embodiments unless otherwise stated. Data is received 202 associated with a user. This can include, for example, receiving data associated with the user's computing device and/or image data that includes a representation of the user. In this example, the user's computing device can include a vehicle, a mobile device (e.g., a mobile phone, tablet, smart watch, or smart glasses), an internet-connected device, or a cellular network-connected device. The image data can be captured by one or more cameras at a transportation station as the user approaches the transportation station and/or obtained from the user's computing device. Embodiments can use a variety of data formats, including image data from a camera, GPS data or other location coordinates, or wirelessly-transmitted data, including that communicated through the Bluetooth standard and Apple, Inc.'s iBeacon™ proximity detection protocol. Once the data is received, the user's registration and account status can be determined 204 and access to same can be authorized 206. In the situation where the user is not associated with a registered account, access to the accounts is rejected 208, but such a user may be invited to create an account. A determination 210 can be made whether a transportation reservation criterion is satisfied. An example reservation transportation criterion includes a threshold proximity. In the situation where the transportation criterion is not satisfied, no reservation will be made. In the situation where the transportation criterion is satisfied, such as when the registered user is determined to be within a predefined threshold proximity to the shared transportation station, at least one shared transport mode reservation event-related actions is executed 212. The transportation criterion can be defined by the shared transportation service provider (and/or configured by the user in some embodiments) in numerous ways, including a geographic boundary or perimeter of a shared transportation station, or simply a measured distance from such a station. The transport mode reservation events can be defined by the service provider and/or configured by the user in many ways, including events such as automatically triggering a transport mode reservation or a post-reservation return, confirming a prior reservation, prompting the user to reserve or return the shared transportation, or debiting the user per a fee associated with the transportation reservation (such as a deposit or other amount to hold a reservation). Via automatically triggering these events, the user can avoid a scenario where he or she must constantly monitor a device to make a reservation or remember to bring funds sufficient to pay for a reservation.

Figure 3A:
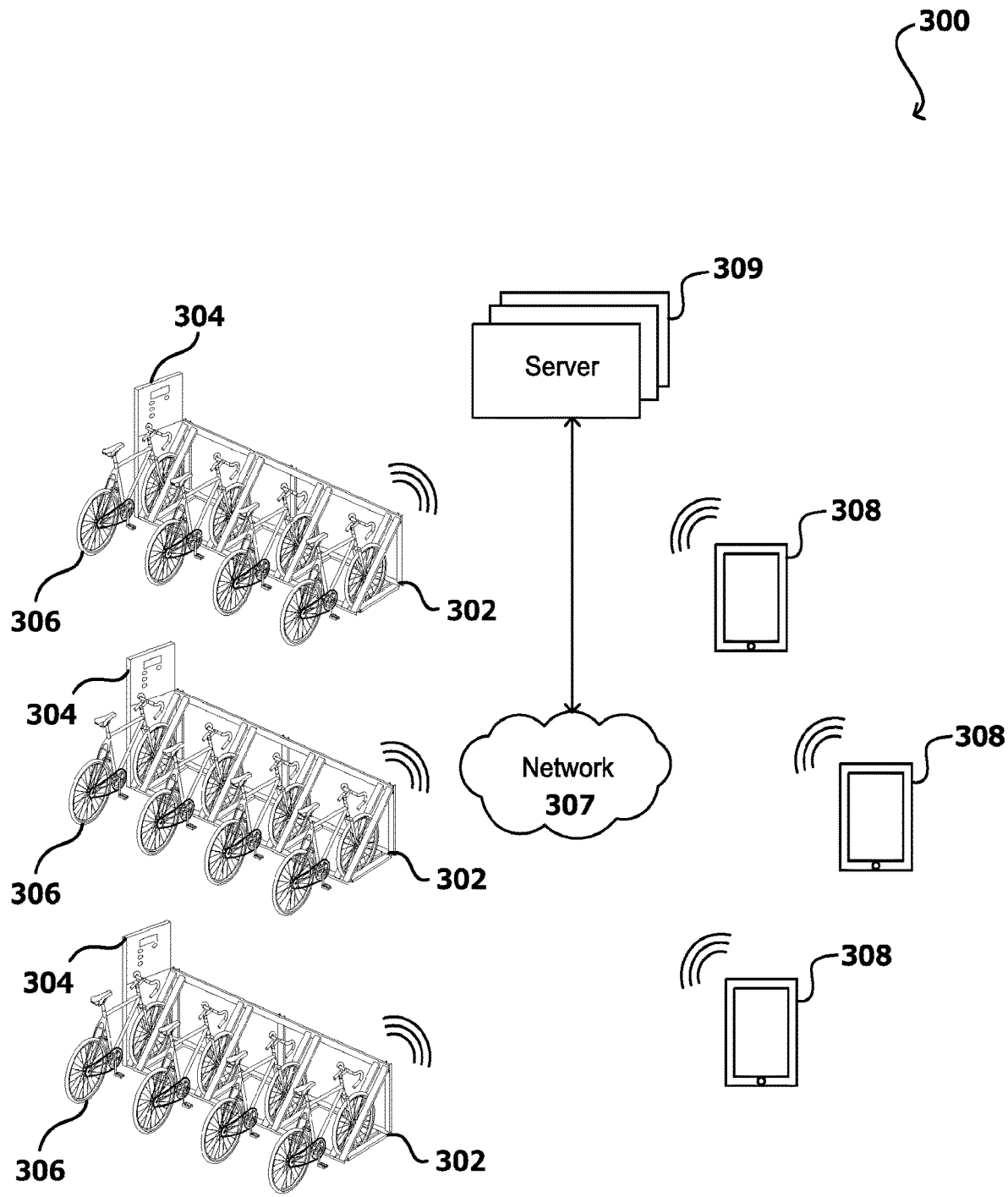
FIG. 3A illustrates an example of a smart shared bicycle system with station-based intelligence, in accordance with various embodiments of the present disclosure.

Various versions of shared transportation modes, stations, and the like may be implemented in accordance with the present disclosure. For example, depicted in FIG. 3A is an illustrative smart bicycle sharing system 300 with station-based intelligence, used in various embodiments. An intelligent bicycle sharing system 300 may include a plurality of bike stations 302 located in different geographic locations, such as various parts of a neighborhood, city, or across multiple regions across the country. The bike stations 302 are connected to one or more networks 307, such as the internet (including by WiFi connectivity), a cellular network, a wide area network (WAN), a local area network (LAN), an Ethernet, or a dedicated network, among other options. The bike stations 302 may collect various data regarding bike 306 utilization and other parameters associated with respective stations. Such data collected from the plurality of bike stations 302, coupled with respective metadata, may be used by a computer server 309 to determine various utilization statistics, patterns, and other insights which can be used to facilitate and optimize the intelligent bicycle sharing system 300 and generate related recommendations for users.

In some embodiments, a bike station 302 of the intelligent bicycle sharing system 300 may include a docking portion for holding a plurality of bicycles 306. The docking station may have a specific number of docking spots and thus can hold a maximum number of bicycles 306. In other embodiments, the docking station does not have individually defined docking spots. The docking portion may include locking mechanisms for locking the bicycles 306 to the bike station 302, and, in some embodiments, there is one locking mechanism for each docking spot for locking one bicycle 306 to the bike station 302. For example, the locking mechanism may include electronic locking functionality. In this example, the locking mechanism may lock conventional bicycles 306 to the bike station 302, in which the bicycles 302 do not need specific or corresponding hardware. Thus, the bicycles of the intelligent bike sharing system 300 may, but need not, be conventional bicycles 306 that do not include special hardware or electronic devices. In some embodiments, the docking portion may not include any locking mechanism, such that the bicycles 306 can be freely used; those bicycles may be removed and returned without needing to be unlocked from the bike station 302. In such embodiments, the bicycles 306 and/or the bike stations 302 can include various sensor devices to detect when a bicycle 306 is removed from the station 302, when a bicycle 306 is returned to the station 302, and/or the general availability of bicycles 306 at the station 302, among other utilization data.

The bike station 302 may include a kiosk 304 portion to facilitate the checking out or checking in of bicycles 306. In some embodiments, the bike station 302 may include one kiosk 304 which controls the locking and unlocking of all of the docking spots at the bike station 302. In other embodiments, each docking spot may include its own kiosk 304. A kiosk 304 may include an interface, such as a human-machine interface, including a combination of user-interfacing components, such as a display, a keypad, buttons, a touchscreen, an audio output, a microphone, and/or a camera, among others. The kiosk 304 may also include various payment or identity verification devices, such as coin-drops, cash receptacles, and magnetic card readers for reading credit cards, debit cards, account cards, or other types of magnetic cards. The kiosk 304 may also include near-field communication (NFC) readers and communication ability via the internet (including by WiFi connection), a local area network (LAN), a wide area network (WAN), a cellular network, an Ethernet, Bluetooth, radiofrequency (RF), or any other wired and/or wireless network 307. The kiosk 304 could further include one or more biometric identification devices such as a fingerprint recognition device.

The kiosk 304 portion of the shared bike station 302 can enable a user to check out a bicycle 306 by performing one or more actions, such as entering account information, swiping, tapping, or holding a card at the card reader, and/or depositing cash, among others. A bike 306 may be unlocked from the bike station 302, and the user can use the bike 306, if information provided by the user is authenticated. Such information may be in the form of entered authentication parameters (e.g., an account number and/or a password), a credit card, or an account card or come through a user device (e.g., a mobile phone potentially including a camera for image confirmation, a "smart watch" also possibly including camera capability, or software embedded in a car). In some embodiments, depositing a required amount of cash may also cause the bike 306 to be unlocked, and any or all of these actions may be configured to be automatically performed once a user is within a threshold proximity of a bike station 302 or otherwise satisfies a transportation reservation criterion.

Figure 3B:
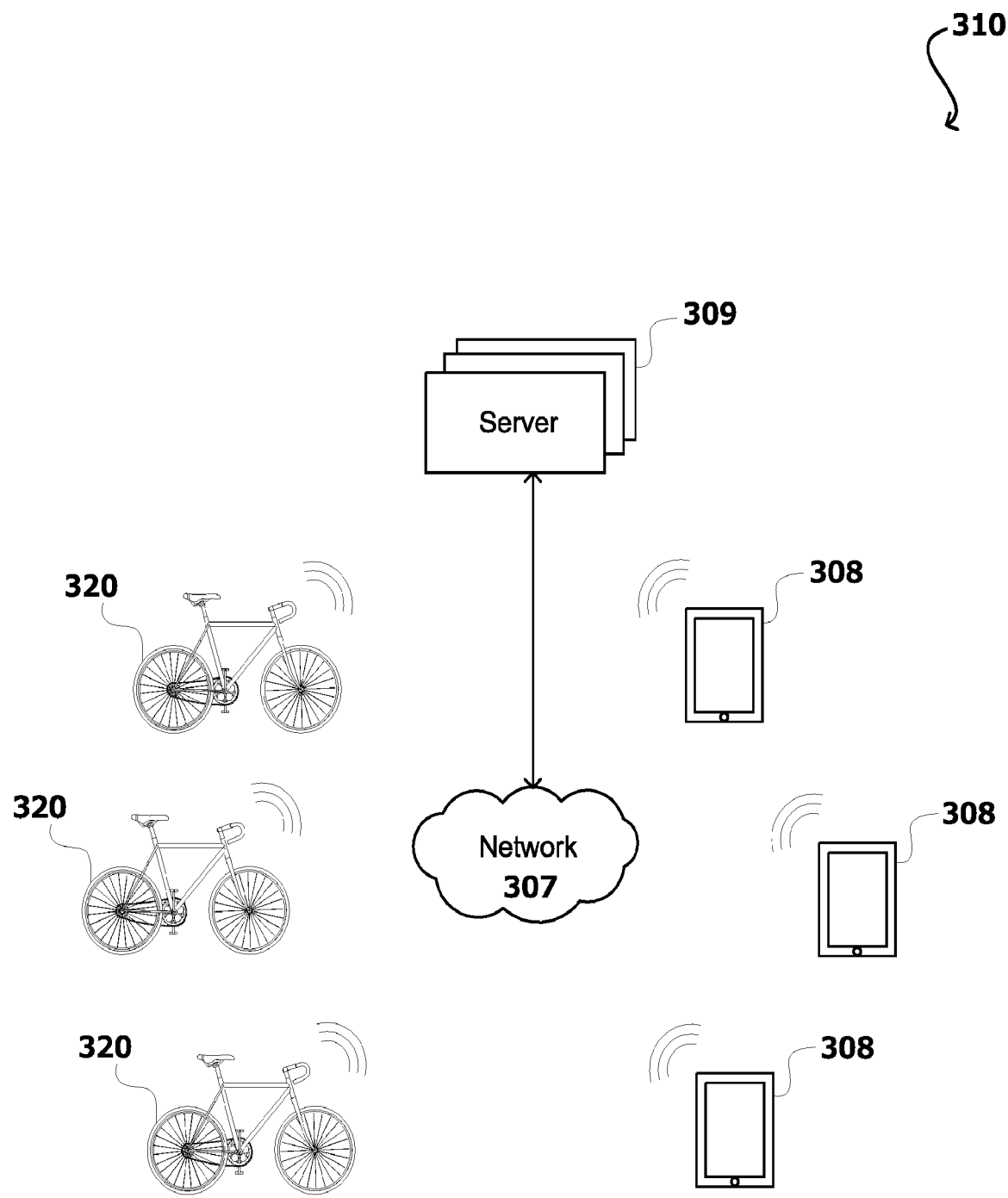
FIG. 3B illustrates an example of a smart shared bicycle system with bike-based intelligence, in accordance with various embodiments of the present disclosure.

In some embodiments, the bike station 302 may include a wireless communication interface that does not include human interfacing components. Rather, in such embodiments, the bike station 302 may communicate with a user device 308 through a communication protocol, such as one for wireless communications. As shown in FIG. 3B, some embodiments 310 do not use wired-connectivity bike stations 302, with the shared bicycles in such embodiments 320 and/or user devices 308 having direct wireless connectivity to one or more networks 307.

The user devices 308 include those through which a user can watch, listen to, and/or read content; they include at least one form of input, such as a keyboard or controller, and at least one form of output, such as a display or speaker. For example, the user device 308 may encompass a mobile phone, tablet computer, laptop computer, or other device carried by a user, and may even be an automobile or other vehicle with software or other onboard computing capability. The user device 308 may have a specific software application (i.e., an "app") installed thereon for providing a user interface between the user, the bike station 302, and/or the bikes 306.

Figure 4:
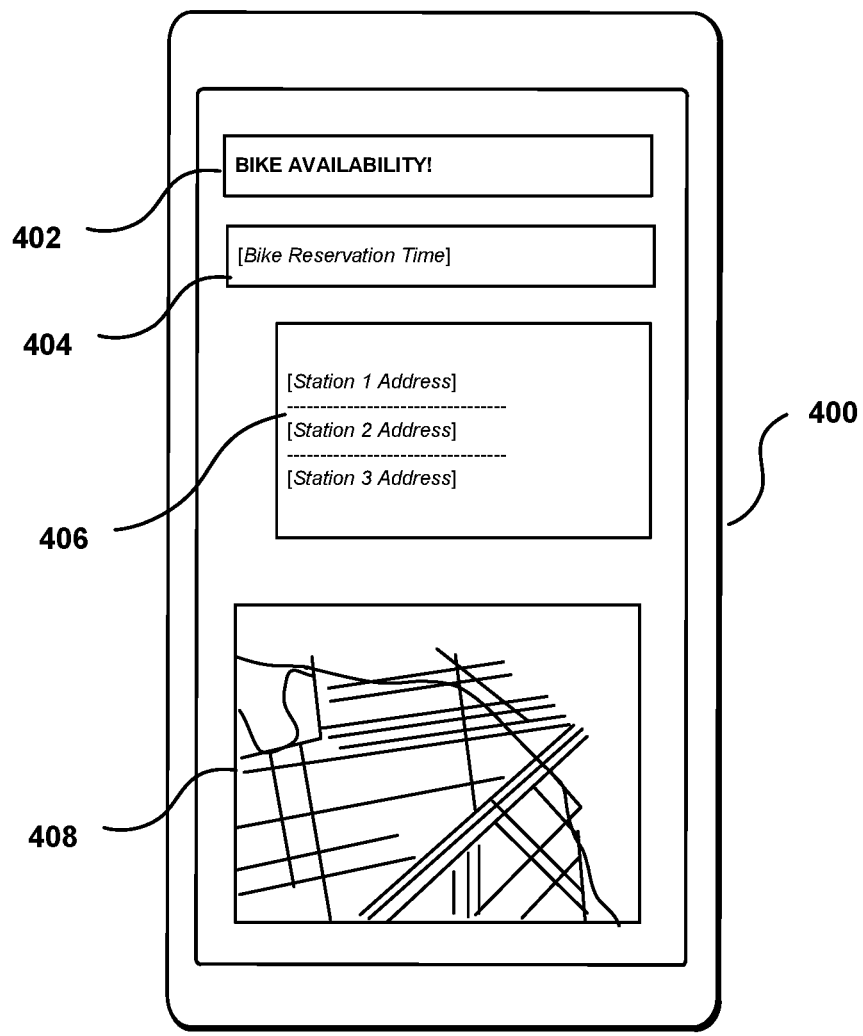
FIG. 4 illustrates an example interface for proximity-based transport mode reservations in accordance with various embodiments of the present disclosure.

As may be seen in the representative user device screen shot 400 of FIG. 4, a user, through an app or a web browser, may perform actions on the user device related to checking out or checking in a shared bicycle. Assuming the user is in proximity to a shared bike station (or otherwise satisfies a transportation reservation criterion), an indicator 402 of bike availability or return dock availability may be displayed, as can the desired bike reservation time 404 and stations 406 where the bikes are available, as well as a map 408 or directions to those stations 406. App functionality is not limited and could include features such as identifying bike stations near a destination or along a certain route. In some embodiments, the app or browser session may be associated with an account for the user and/or be connected to a form of payment, such as payment card credentials (e.g., a credit or debit card number) or bank account credentials (e.g., an account number and a routing number), or other third party payment platforms. In some embodiments, authentication and user identification may be performed passively, such as through proximity-based sensing. For example, a user device may emit a signal and when the user and the device approach a bike station within the station's signal detection range, the bike station may detect the device and receive the signal emitting from the user device. The signal may include authentication parameters, thereby causing the user to be automatically authenticated and a bicycle to become unlocked without action by the user.

Figure 5:
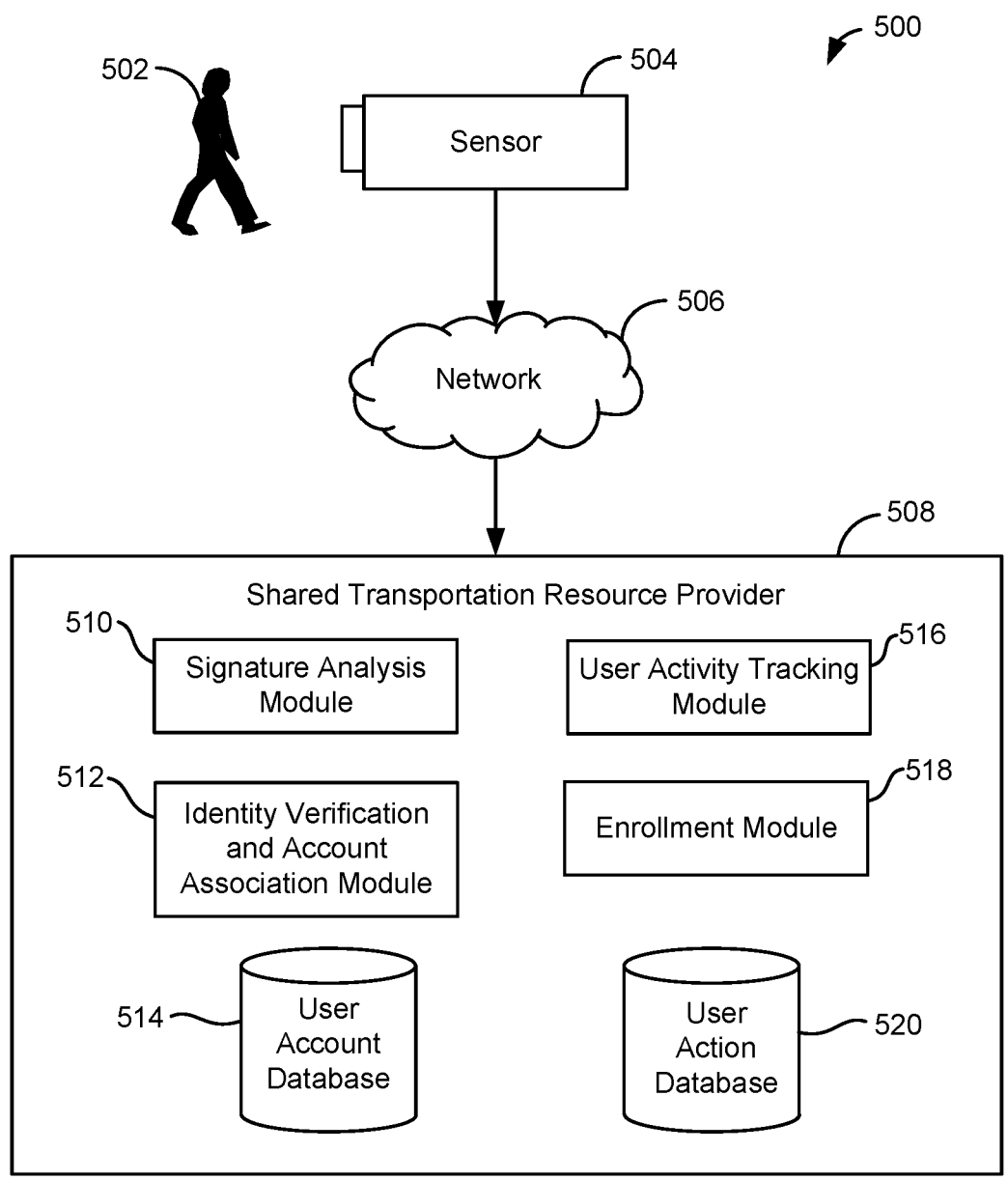
FIG. 5 illustrates an example implementation for identity verification and account association using facial recognition, in accordance with various embodiments of the present disclosure.

As noted, in illustrative embodiments, the approaches herein may recognize, and attempt to authorize, the user upon he or she entering a designated perimeter, or other defined geographic boundary, around a bike station or he or she otherwise satisfying another transportation reservation criterion. FIG. 5 illustrates an example system implementation 500 for identity verification and account association using facial recognition analysis, in accordance with various embodiments. In an embodiment, the FIG. 2 process 200 may be executed by the shared transportation resource provider 508 of FIG. 5. In this example, the system 500 includes a sensor 504 and a resource provider 508 that communicate through a network 506. It should be noted that additional services, providers, and/or components can be included in such a system, and, although some of the services, providers, and components are illustrated as being separate entities and/or components, the illustrated arrangement is provided as an example, and other arrangements as known to one skilled in the art are contemplated by the embodiments described herein.

The sensor 504 can include one or more cameras and be capable of outputting data which includes a representation of a user 502, who is within the defined proximity of a bike station, from which a detected signature associated with the user 502 can be determined. In some embodiments, a movement signature can be detected instead of a facial signature, in which the movement signature includes a representation of the user's movements. A movement signature may be the same as, different from, or have commonalities with, the facial signature. The sensor 504 may include a camera such as a conventional still camera, video camera, satellite imaging device, a low-resolution camera, and/or a high-resolution camera, among others. In some embodiments, the sensor 504 may include a camera that detects a visible portion of the electromagnetic spectrum or other portions of the electromagnetic spectrum such as an infrared portion. The sensor 504 may include a motion sensing device, such as motion sensors operating on infrared sensing, radio frequency sensing, light sensing, sound and vibrational sensing, or magnetic sensing, among other sensor types, or a combination thereof. The sensor 504 may be located local to, or remote from, the resource provider 508. More particularly, the sensor 504 may be strategically positioned at or near a bike station or other location of interest where a shared-transportation reservation may be made or a related action taken, such as a store, an office building, a subway station, a school, a house of worship, or other such location. In any event, the sensor 504 may be used to obtain sensor data that includes a representation of the user 502. Depending on the provider's configuration, this may occur as the user 502 approaches, enters, or otherwise walks about the location of the bike station or another boundary. In approaching that predefined proximity, the user 502 is not necessarily walking and could be in an automobile, bus, train, ferry, or the like.

The shared transportation resource provider 508 obtains the sensor data from the sensor 504 and performs the various computing tasks related to associating the user 502 with a user account and triggering shared transportation reservation and other events in the user account based on actions performed by the user 502. The resource provider 508 can utilize a signature analysis module 510, an identity verification and account association module 512, a user account database 514 or lookup tables, a user activity tracking module 516, an enrollment module 518, and a user action database 520 or lookup tables. The network 506 can include any appropriate network, such as the internet (including WiFi connectivity), a local area network (LAN), a wide area network (WAN), a cellular network, an Ethernet, Bluetooth, radiofrequency (RF), or other wired and/or wireless network.

In an illustrative embodiment, the signature analysis module 510 receives the sensor data generated by the sensor 504 and determines a detected signature of the user 502 from the sensor data. The sensor data may have undergone pre-processing by an optional pre-processing module (not shown) before receipt by the signature analysis module 510.

The pre-processor module may prepare the sensor data, which may be raw sensor data, for use by the signature analysis module 510 in facial recognition or other forms of analysis that may be conducted on the sensor data. For example, in an embodiment in which the sensor data is image data, the pre-processing module may perform image processing such as frame selection, cropping, background removal, and image contrast enhancement, among various other adjustments to the image data. In an embodiment, the pre-processing module may isolate or extract a representation of only the user from the image data. Such pre-processing tasks may be performed according to predetermined steps (i.e., batch processing) or on the fly based on a defined criteria.

The signature analysis module 510 may receive processed sensor data or raw sensor data, and determine a detected user signature therefrom. In some embodiments, the signature analysis module 510 may perform all the functions described above with respect to the pre-processing module. The signature analysis module 510 may further process the sensor data in order to extract the features, such as one or more feature vectors, that make up the detected signature. The signature analysis module 510 applies one or more analytical techniques to extract one or more features from the sensor data. One or more computer vision and recognition techniques can be applied to image data to generate a signature for the user 502, which is a unique digital representation of the customer's identity.

Additionally or alternatively, the received data can be in a form other than image data. For example, as a user 502 enters the defined proximity of a bike station, the user 502 may be prompted to verify his or her identity in order to be associated to a user account. Such prompt may be made in any number of ways known in the user interfacing and user experience arts, including through a mobile user device app, an automated phone call, or prompting through a vehicle's onboard software. A user may be prompted to scan a Quick Response (QR) code on a kiosk located at or near a bike station, and the QR code may be generated on the user's smartphone. In some embodiments, in lieu of the smartphone, the user may use another type of device, including a tablet, a laptop, or notebook computer; a smart watch or other electronic wearable device; and the like. The bike station kiosk may include a scanner that reads the QR code and a processor that associates the QR code with a stored user account, thereby associating the user 502 with the user account. It should be appreciated that the QR code is but one example of many types of identity verification tokens that can be presented by the user 502 to verify the user identity's and access the associated user account. For example, the user 502 could alternatively present a bar code or other form of data token on his or her smartphone, a radio frequency identification (RFID) card, a near field communication (NFC) card, or the like at the kiosk to the same effect. The signature analysis module 510, in turn, will combine extracted features and/or data to generate the detected user signature.

The account database 514 contains one or more user accounts, each of which is defined by a set of associated data. The set of associated data for one user account may include a name, a physical address, an email address, a phone number, a payment method, and/or a stored facial recognition or other signature, among other such information. In an embodiment, the stored user signature is associated with the user's account through an enrollment process conducted by the enrollment module, as discussed further herein.

The identity verification and account association module 512 uses the signature generated by the signature analysis module 510 to verify the identity of the user 502 and/or to associate a user account with the user 502. Specifically, the identity verification and account association module 512 matches the detected signature to a stored signature in the account database 514, lookup tables, or the like. Various matching algorithms, such as data matching algorithms and line matching algorithms, can be utilized to compare signatures. The detected signature may be considered to "match" a stored signature if the detected signature matches the stored signature within a predefined error margin or threshold. For example, in an illustrative embodiment, the detected signature may be considered to match a stored signature if the detected signature matches the stored signature at a ninety-five percent (95%) level. In another example, the detected signature can be associated with a highest matching or confidence score. In an embodiment, the detected signature may be compared to a plurality of stored signatures until a match is detected. Upon determining a match, the respective user account associated with the stored signature is associated with the user 502, and access to that user's account is enabled.

A user activity tracking module 516 may be utilized to determine locations of, and certain actions performed by, the user 502. The user activity tracking module 516 may receive as inputs data from one or more detection systems, which may include various cameras and/or other sensors that collect data representing user actions. In an embodiment, the user activity tracking system may include the sensor 504 used for user analysis or may utilize data obtained from the sensor 504. The user activity tracking module 516 receives data from the detection systems and determines the user actions from the data. In some embodiments, the data is image data. User activity tracking module 516 may apply one or more computer vision techniques to the data to recognize the user 502. In another embodiment, the activity tracking module 516 may determine a user's location through Global Positioning System (GPS) data or other location coordinates or data, by tracking the user's path since passing a checkpoint, or by determining the user's proximity to certain checkpoints. In an embodiment, the user actions determined by the user activity tracking module 516 may be based on a predefined list of possible user actions and the expected sensor data that correspond to each of the possible user actions. In some other embodiments, there may not be a predefined finite list of user actions, but rather a set of rules for determining a user action on the fly. The rules may be predefined or created and refined by the user activity tracking module 516 through various established machine learning and artificial intelligence techniques, including those employing a neural network. In either case, the user activity tracking module 516 also can determine the event to be triggered in the user account which corresponds with the detected user location and/or action, and the user activity tracking module 516 can initiate the event in the user account that has been associated with the user 502 and for which access has been enabled.

In an embodiment, the user action database 520 contains a defined list of possible user actions and the corresponding transportation mode reservation event to trigger in the user account. For example, the user action database 520 may contain a list of all bicycles or other transport modes available through the shared transportation system, including current availability and price. In this example, the event to trigger may involve adding a digital representation of the desired transport mode to an electronic shopping cart of sorts or removing the digital representation of the item from the electronic "cart." The user activity tracking module 516 may access the user action database 520 to determine the event to trigger upon detecting a user action.

An enrollment module 518 creates the stored signature associated with a user account in the account database. The enrollment module 518 can associate a user 502 with a user account through facial recognition and/or an alternate identity verification token, which may occur as a part of an enrollment process. The alternate identity verification token may include a physical token such as a card or a data token such as a barcode or password. The enrollment module 518 may obtain image data of the user and generate a signature from the image data. In an embodiment, the enrollment module 518 may utilize resources from the signature analysis module 510. The user signature can be stored as being associated with the user account. Thereafter, the stored signature can be used to associate the user 502 to the user account.

The shared transportation resource provider 508 may include additional modules for carrying out various other optional functionalities. One or more of the modules, databases, and/or lookup tables described herein may be implemented jointly or separated further into additional modules. In some embodiments, the resource provider 508 may be implemented on a computing device or a network of server computing devices that includes one or more processors and one or more memory components containing software applications executed by the processors. The features and services provided by the resource provider 508 may be implemented as web services consumable via a communication network. In further embodiments, the resource provider 508 can be provided by one more virtual machines implemented in a hosted computing environment. The hosted computing environment may include one or more rapidly provisioned and released computing resources, which computing resources may include computing, networking, and/or storage devices. For reference, a hosted computing environment is often referred to as a "cloud" computing environment.

In an embodiment, the resource provider 508 or another bike sharing system affiliate can set up the sensor 504 in or near the physical bike station location, and sensor data of users can be sent to the resource provider 508. The resource provider 508 may perform the user 502 identity verification and user account association remotely, the resource provider 508 may serve the associated user account information back to a particular bike station once the association has been established, and the resource provider 508 may trigger events in the user account accordingly. In another embodiment, the resource provider or an on-site affiliate may administer the user account and trigger events in the user account accordingly.

As noted, FIG. 2 illustrates an example process 200 using facial or other analysis for proximate user identity verification and account association, in accordance with various embodiments. In an embodiment, the process 200 may be executed by the resource provider 508 of FIG. 5. It should be understood that, for any process discussed herein, there can be additional, fewer, or alternative steps performed in similar or alternative orders, or in parallel, within the scope of the various embodiments unless otherwise stated. In this example, sensor data is received, in which the sensor data includes a representation of a user 502 and may be output from a sensor such as a camera. A recognition technique may be applied to the sensor data to determine a signature for the user 502. The detected signature may be matched to a signature stored in a database, and associated with a user account, within a predetermined error margin, thereby identifying the user. Access to the user account is enabled in response to matching the detected signature with the stored signature within the predetermined error margin. In some embodiments, the association between the user and the user account may be additionally verified through an alternate identity verification token in order to enable access to the user account. The process may run continuously such that a user 502 can be re-associated with the user account if the association is lost at any point.

Upon enabling access to the user account, a shared transportation reservation or related event may be triggered, automatically or manually, in the user account in response to detecting a user entering or exiting a predefined proximity of a bike or other shared transportation station. This event process may be executed wholly or in part by the resource provider 508 of FIG. 5. The event triggered in the user account may include logging the user action, debiting the user account an amount associated with a bike or other transportation rental (such as a deposit and/or service charge) without needing to present any type of token or tickets, or producing a notification corresponding to the user, such as a notice of bike availability or a bike return opportunity. The time and location of when a user enters and departs from a bike station, as well as an identification (ID) for the rented/shared bike or other vehicle, may be data used to determine the user action.

An enrollment process can be utilized for creating a stored signature associated with a user account. In an embodiment, the process may similarly be executed wholly or in part by the resource provider 508 of FIG. 5. For purposes of enrollment and creating the stored signature, a user could be prompted to provide an alternate verification token, such as a card, an identification (ID), a barcode, or a password. The alternate verification token may be validated as being associated with a user account. The user would thus be associated with the user account. Enrollment sensor data is obtained and includes a representation of the user. In an embodiment, the enrollment sensor data may be image data generated by a camera recording or capturing an image of the user 502. In an embodiment, the enrollment sensor data may be obtained through an active process, in which the user is asked to participate in an image capture event or perform some act for purposes of capturing image data. In another embodiment, the enrollment sensor data may be obtained through a passive process, in which the user image is automatically captured in the course of using a shared transportation app or otherwise using an intelligent shared transportation system such as that disclosed herein. In either case, an enrollment signature can be determined from the enrollment sensor data by applying one or more computer vision and recognition techniques to the sensor data. The enrollment signature is then associated with the user account to which the user 502 was associated via the alternate verification token. The enrollment signature may be saved as the stored signature associated with the user account.

In an embodiment, the stored signature may be continuously developed and/or updated over time as more detected signatures are recorded as being associated with the user account. Additionally, the stored image signature used as an identity verification token may be used to validate and refine other forms of identity verification, and other forms of identity verification can be used to validate and refine the stored signature. In an embodiment, the same stored signature may be used in multiple locations in which the user account may be accessed. Additionally, the same stored signature may be associated with multiple user accounts without requiring separate enrollment processes.

In an embodiment, the sensor data that may be received includes a representation of a secondary user associated or tied with a primary user (previously referred to as "the user") or the user account, and an event can be triggered in the primary user account in response to detecting a secondary user action. In an example, the secondary user can be associated with the primary user through spatial and temporal proximity, such as entering a bike station, or a predetermined geographic area related thereto, together. In an embodiment, the secondary user and the primary user may perform a certain action to indicate association, such as holding hands, standing together at specified spots within a defined region, or other predefine visual signal. Upon doing so, the primary user and the secondary user are both associated with the user account and can be tracked independently, and user actions performed by either user can trigger shared transportation reservation and events in the user account.

In accordance with various embodiments, utilizing imaged signature analysis as an identity verification layer can be used alone or among other identity verification layers. In some embodiments, the image analysis layer can replace the need for a user to perform the additional action of presenting an identity verification token such as a card or scanning a barcode. In this way, the customer's unique image serves as the identification verification token. In certain embodiments, the image analysis as an identity verification layer can be used in conjunction with another recognition layer for added security and accuracy. For example, a situation may arise in which the face of a customer may be obscured to some degree, either by environmental obstructions such as shelves, signage, and other customers, or by accessories such as hats, glasses, and the like. In this example, being able to identify and track a customer by another fashion can provide more reliable customer identification and tracking.

As noted, a camera may be used to obtain image data which includes a representation of a user or other shared transportation customer. This may occur as the user approaches or otherwise nears the physical location of a bike station. One or more computer vision and recognition techniques can be applied to the image data to generate a signature or digital representation of the customer, including an n-dimensional feature vector of numerical features representing some object such as the user or the user's vehicle. The signature can be matched to a stored signature that is associated with a particular user account, thereby identifying and associating the user with that particular user account. The user account can be accessed and certain actions performed by, or attributed to, the customer can trigger certain events in the user account.

For example, a computer vision technique, such as facial recognition, can be applied to the image data to determine an identifier, such as a facial recognition identifier known as a faceprint (i.e., a combination of various-machine detected facial landmarks). The systems and methods herein may similarly employ computer vision techniques to obtain a matching identifier, such as the faceprint, and thereby associate the detected user with the user account. In an embodiment, using computer vision techniques to determine an identifier may include analyzing the image data to determine a feature vector associated with the user, comparing the feature vector to a plurality of stored feature vectors, and determining, from the plurality of stored feature vectors, a stored feature vector that matches the feature vector to at least a threshold deviation.

In an embodiment, the stored user signature can be created through an enrollment process, which, again, can be an active enrollment process or a passive enrollment process. In an active enrollment process, for example, a customer may be asked to perform an act for the purpose of capturing image data from which a signature can be determined through computer vision and recognition techniques. For purposes of enrollment and recording the signature, the customer may provide an alternative form of identity verification associating the user with his or her particular account. In a passive enrollment process, for example, a customer may be asked, upon approaching or entering a physical location such as a bike station, to provide an alternate form of identity verification associating the customer with a particular user account. As the customer approaches, enters, or otherwise moves around the physical location, a camera obtains image data that includes a representation of the customer. A signature can then be generated for the customer by applying one or more computer vision and recognition techniques to the actively or passively-gathered image data. The signature can be stored and associated with the particular user account with which the customer is associated. Thereafter, the stored signature can be used to associate the customer to the particular user account. In an embodiment of passive enrollment, the stored signature may be developed and/or updated over time and generated from a plurality of samples of image data of the customer in different instances, such as over an enrollment period, thereby increasing the fidelity of the stored signature.

In any of the embodiments, among other things, the intelligent bike sharing system 200 may collect various types of data across the plurality of bike stations. For example, each bike station may collect data regarding when a bike is checked in or out, and by whom. In some embodiments, each bike in the intelligent bike sharing system includes a unique identifier such that the bike stations can identify which bike is being checked out or checked in. Thus, the journey of a particular can be tracked. For example, it can be detected that Bike A was checked out at a bike station at a first location and checked in at another bike station at a second location at a later time, and thus it can be inferred that Bike A was used for a trip from the first location to the second location. A server computer on the network may receive the data and the metadata collected from kiosk or otherwise from the bike station. The data collected from the bike stations may include metadata such as a bike station identifier and timestamp, and may include or be associated with a geographic location among other metadata.

Neural network/machine learning techniques may be applied, using the collected data and metadata, to "learn" meanings from systems' and particular users' shared transportation patterns, histories, trends, tendencies, and the like, in order to offer the user 502 better-targeted shared transportation recommendations and notifications, including recognizing where a given user is likely to reserve a shared mode of transportation. A variety of neural network types could be applied, including, but by no means limited to, feedforward, recurrent, radial basis function, modular, and self-organizing neural networks. Prior to production environment use, a non-production data set may be employed for training a neural network model for generating the recommendataions and notifications. Further, as known in the neural network and artificial intelligence arts, graphics processing units (GPUs) are effective for many deep learning applications, and the present systems and methods can be used with GPU-based systems, as well as those using a central processing unit (CPU).

Figure 6A:
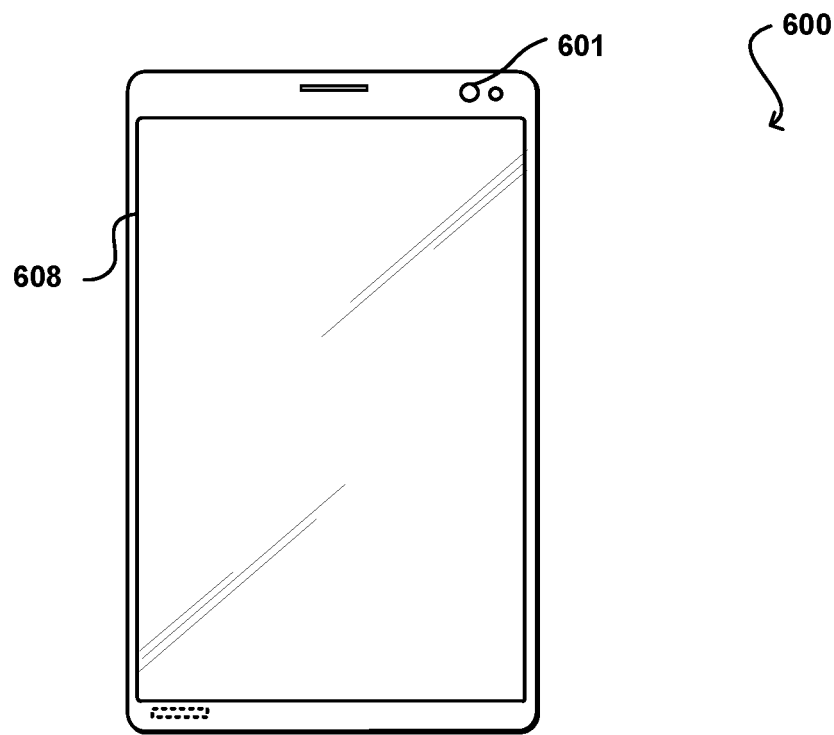
FIGS. 6A and 6B illustrate components of an example computing device that can be used in accordance with various embodiments of the present disclosure.
Figure 6B:
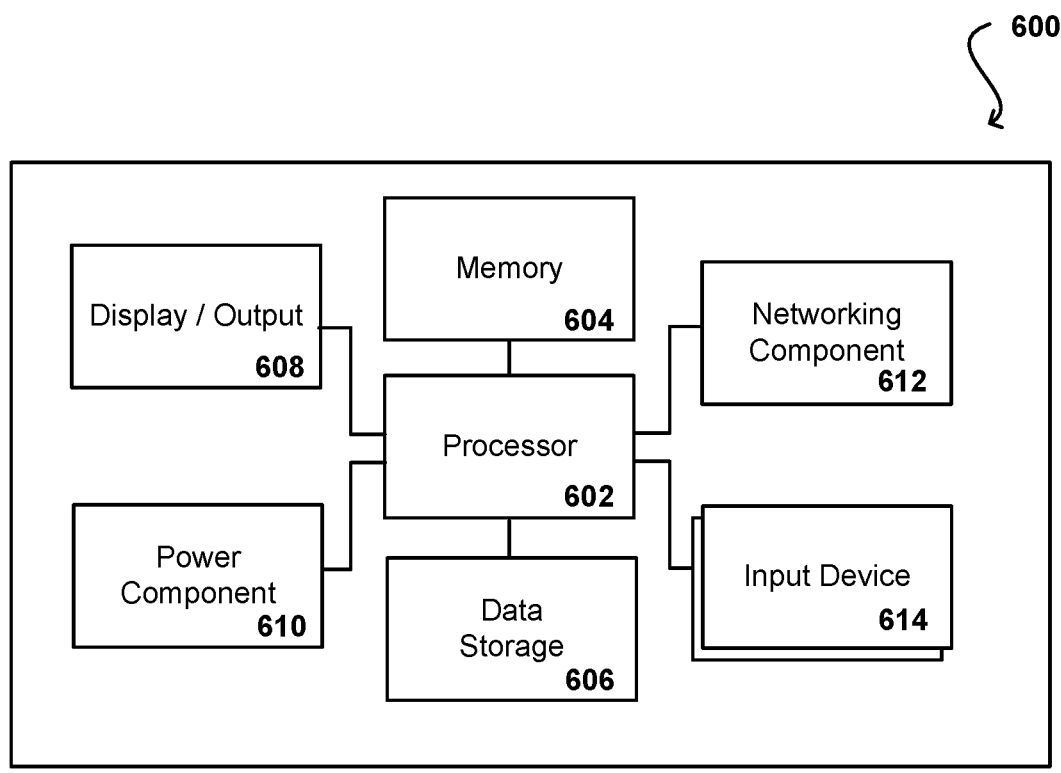

FIGS. 6A and 6B illustrate a set of basic components of a computing device 600 on which the presently disclosed techniques may be carried out. Specifically, in an embodiment, the resource provider 508 of FIG. 5 may be implemented on computer device 600, and the user 502 may use a computing device 600 at least similar in part. In this example, the device includes at least one camera 601 and at least one processor 602 for executing instructions that can be stored in a memory device or element 604. As would be apparent to one of ordinary skill in the art, the device can include many types of memory, data storage, or computer-readable media, such as a first data storage for program instructions for execution by the at least one processor 602, the same or separate storage can be used for images or data, a removable memory can be available for sharing information with other devices, and any number of communication approaches can be available for sharing with other devices. The device typically will include a power component 610, a networking component 612, at least one data storage component 606, and at least one type of display element 608, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element, such as at least one image capture element positioned to determine a relative position of a user 502 and at least one camera 601 operable to image a user, people, or other viewable objects in the vicinity of the device 600. An image capture element can include any appropriate technology, such as a charge-coupled device (CCD) camera 601 element having a sufficient resolution, focal range, and viewable area to capture an image of the user when the user is operating the device 600. Methods for capturing images or video using an image capture element with a computing device are well known in the art and will not be discussed herein in detail. It should be understood that image capture can be performed using a single image, multiple images, periodic imaging, continuous image capturing, image streaming, and the like.

The device 600 can include at least one motion and/or orientation determining element, such as an accelerometer, digital compass, electronic gyroscope, or inertial sensor, which can assist in determining movement or other changes in orientation of the device. The device can include at least one additional input device 614 able to receive conventional input from a user. This conventional input can include, for example, a push button, touch pad, touch screen, wheel, joystick, keyboard, mouse, trackball, keypad, or any other such device or element whereby a user can input a command to the device. These input/output (I/O) devices could even be connected by a wireless infrared or Bluetooth or other link as well in some embodiments. In some embodiments, such a device might not include any buttons at all and might be controlled only through a combination of visual and audio commands, such that a user can control the device without having to be in contact with the device.

Figure 7:
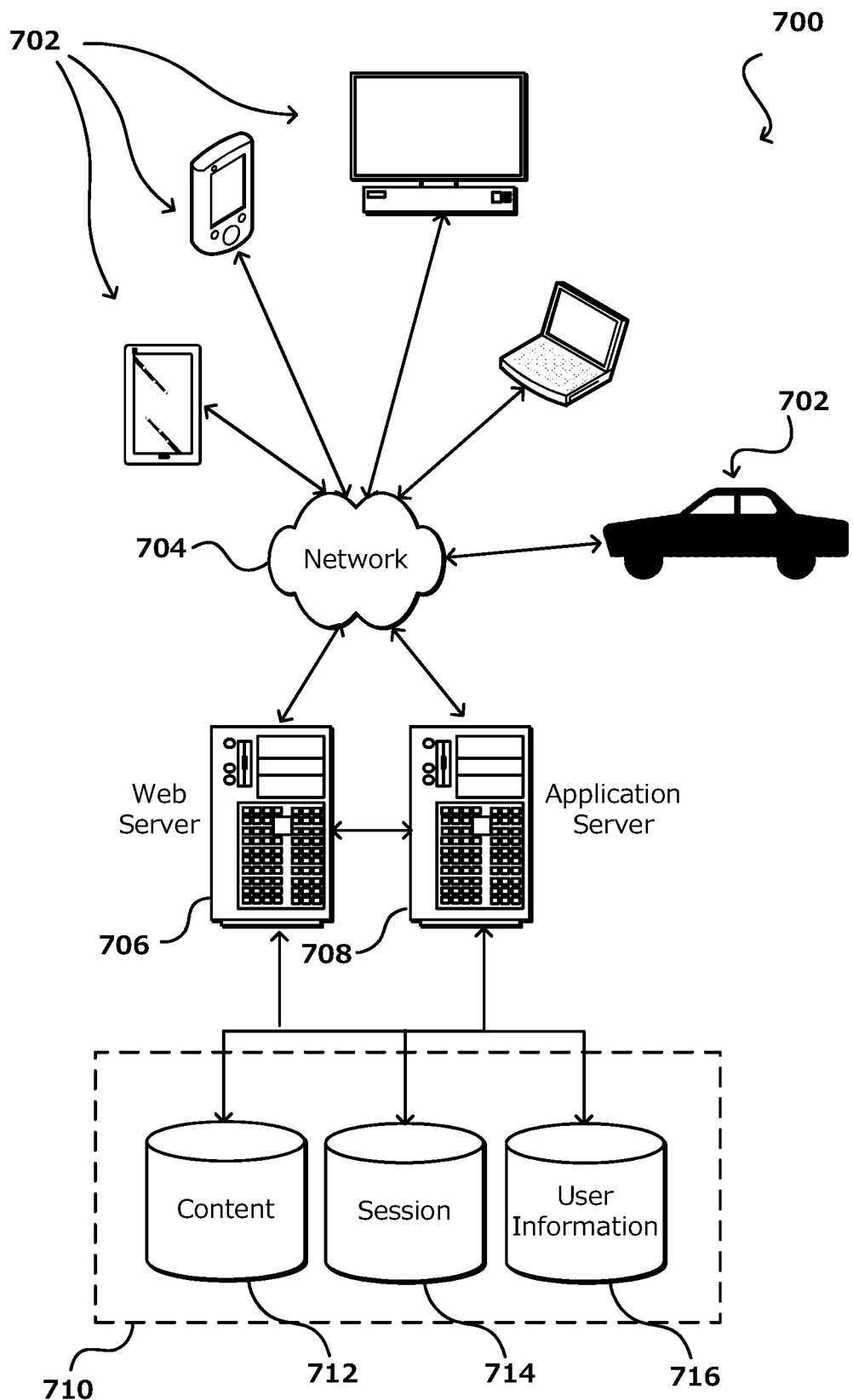
FIG. 7 illustrates an example environment in which aspects of various embodiments can be implemented of the present disclosure.

As discussed, different approaches can be implemented in various environments in accordance with the described embodiments. For example, FIG. 7 illustrates other details of an environment 700 for implementing aspects in accordance with various embodiments. As will be appreciated, although a Web-based environment is used for purposes of explanation, different environments may be used, as appropriate, to implement various embodiments. The system includes an electronic user or client device 702, which can include any appropriate device operable to send and receive requests, messages, or information over an appropriate network 704 and convey information back to a user of the device. Examples of such user or client devices include personal computers, cell phones, tablet computers, handheld messaging devices, laptop computers, set-top boxes, personal data assistants, electronic book readers, and the like, and even automobiles and other vehicles with apps or other software onboard to facilitate making shared transportation reservations and taking related actions. The network can include any appropriate network, including an intranet, the internet, a cellular network, a wide area network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710, which may be at the shared transportation resource provider end or hosted by a third party. It should be understood that there can be several application servers, layers, or other elements, processes, or components, which may be chained or otherwise configured and which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server 708 can include any appropriate hardware and software for integrating with the data store 710 as needed to execute aspects of one or more applications for the user/client device 702 and handling a majority of the data access and business logic for an application. The application server provides access control services in cooperation with the data store and is able to generate content such as text, graphics, audio, and/or video to be transferred to the user, which may be served to the user by the Web server 706 in the form of HTML, XML, or another appropriate structured language in this example. The handling of all requests and responses, as well as the delivery of content between the user device 702 and the application server 708, can be handled by the Web server 706. It should be understood that the Web and application servers are not required and are merely example components, as structured code can be executed on any appropriate device or host machine as discussed elsewhere herein.

The data store 710 can include several separate data tables, databases, or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user and can access the catalog of available bikes to obtain information about items of that type. The information can then be returned to the user, such as in a results listing in an app or on a Web page that the user is able to view via a browser on the user device 702. Information for a particular bicycle, station, or other item of interest could be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be implemented in a wide variety of operating environments, which in some cases can include one or more user computers or computing devices which can be used to operate any of a number of applications. User or client devices 702 can include any of a number of general purpose personal computers, such as laptop or notebook computers running a standard operating system, as well as cellular, wireless, and handheld devices running mobile software and capable of supporting a number of networking and messaging protocols. An intelligent shared transportation system such as that herein can also include a number of workstations running any of a variety of commercially-available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide area network, a virtual private network, the internet, an intranet, an extranet, a public switched telephone network, an infrared network, a wireless network, and/or any combination thereof In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response requests from user devices 702, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element, or keypad) and at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), or an infrared communication device) and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices will also typically include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices, such as network input/output devices, may be employed.

Storage media and other non-transitory computer readable media for containing code, or portions of code, can include any appropriate media known or used in the art, including storage media and other non-transitory media, such as, but not limited to, volatile and non-volatile, removable, and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative, rather than a restrictive, sense. It will, however, be evident that various modifications and changes may be made thereunto without departing from the broader spirit and scope of the invention as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computer-implemented method, comprising:
   receiving location coordinates associated with a geographic location of a computing device;
   determining that the geographic location is within a threshold distance to a bicycle station, the bicycle station comprising a plurality of shared bicycles, a plurality of docking spots each configured to move between an unlocked position wherein a corresponding one of the plurality of shared bicycles is not maintained in the bicycle station, and a locked position wherein the corresponding one of the plurality of shared bicycles is maintained in the bicycle station, and a kiosk for moving at least one of the plurality of docking spots between the unlocked and locked positions;
   receiving user identification information comprising sensor data automatically captured by one or more sensors at the bicycle station that includes a representation of a user;
   analyzing the sensor data to determine a feature vector;
   comparing the feature vector to a plurality of stored feature vectors;
   determining a stored feature vector from the plurality of stored feature vectors that matches the feature vector to at least a threshold deviation, the stored feature vector associated with a registered user, the registered user associated with a user account of a service provider;
   authorizing access to the user account;
   triggering a transport mode reservation event in the user account; and
   unlocking a first docking spot of the plurality of docking spots with the kiosk to automatically provide access to a first bicycle of the plurality of shared bicylces associated with the transport mode reservation event based at least in part on an automatic authentication procedure when the user is within a signal detection range associated with the bicycle station.

2. The computer-implemented method of claim 1, wherein the transport mode reservation event comprises at least one of: finalizing a transportation reservation, debiting the user account an amount associated with the transportation reservation event, or providing a notification to confirm a transport reservation or otherwise corresponding to the transport mode reservation event.

3. The computer-implemented method of claim 2, wherein the notification is a prompt concerning at least one transportation reservation opportunity.

4. The computer-implemented method of claim 1, wherein the location coordinates are Global Positioning System (GPS) navigation system data.

5. The computer-implemented method of claim 1, wherein the transport mode reservation event comprises at least one of: finalizing a transportation reservation, debiting the user account an amount associated with the transport mode reservation event, or providing a notification to confirm a transport reservation or otherwise corresponding to the transport mode reservation event.

6. The computer-implemented method of claim 1, wherein the one or more sensors comprise (i) one or more cameras capable of capturing image data, (ii) one or more motion sensing devices capable of capturing movement data, or (iii) a combination thereof.

7. The computer-implemented method of claim 1, wherein the computing device is at least one of:
   a vehicle, a mobile device, an internet-connected device, or a cellular network-connected device.

8. The computer-implemented method of claim 1, further comprising:
   using a trained model to generate a recommendation for transport mode reservation events.

9. The computer-implemented method of claim 8, wherein the trained model is trained using a neural network or machine learning.

10. The computer-implemented method of claim 1, wherein the kiosk is configured to move each of the plurality of docking spots between the unlocked and locked positions.

11. The computer-implemented method of claim 1, wherein the kiosk comprises a human-machine interface, a number of payment verification devices, a near-field communication reader, and one or more biometric identification devices.

12. The computer-implemented method of claim 11, wherein the human-machine interface comprises a display, a keypad, a touchscreen, an audio output, a microphone, and a camera, wherein the number of payment verification devices comprises at least one of a coin-drop, a cash receptacle, and a magnetic card reader, and wherein the one or more biometric identification devices comprises a fingerprint recognition device.

13. A computing system, comprising:
at least one processor; and
memory including instructions that, when executed by the at least one processor, cause the computing system to:
receive location coordinates associated with a geographic location of a computing device;
determine that the geographic location is within a threshold distance to a bicycle station, the bicycle station comprising a plurality of shared bicycles, a plurality of docking spots each configured to move between an unlocked position wherein a corresponding one of the plurality of shared bicycles is not maintained in the bicycle station, and a locked position wherein the corresponding one of the plurality of shared bicycles is maintained in the bicycle station, and a kiosk for moving at least one of the plurality of docking spots between the unlocked and locked positions;
receive user identification information comprising sensor data automatically captured by one or more sensors at the bicycle station that includes a representation of a user;
analyze the sensor data to determine a feature vector;
compare the feature vector to a plurality of stored feature vectors;
determine a stored feature vector from the plurality of stored feature vectors that matches the feature vector to at least a threshold deviation, the stored feature vector associated with a registered user, the registered user associated with a user account of a service provider;
authorize access to the user account;
trigger a transport mode reservation event in the user account; and
unlock a first docking spot of the plurality of docking spots with the kiosk to automatically provide access to a first bicycle of the plurality of shared bicycles associated with the transport mode reservation event based at least in part on an automatic authentication procedure when the user is within a signal detection range associated with the bicycle station.

14. The computing system of claim 13, wherein the transport mode reservation event comprises at least one of: finalizing a transportation reservation, debiting the user account an amount associated with the transport mode reservation event, or providing a notification to confirm a transport reservation or otherwise corresponding to the transport mode reservation event.

15. A computer-implemented method, comprising:
receiving location coordinates associated with a geographic location of a computing device;
determining that the geographic location is within a threshold distance to a portable transport device station, the portable transport device station comprising a plurality of shared portable transport devices, a plurality of docking spots each configured to move between an unlocked position wherein a corresponding one of the plurality of portable transport devices is not maintained in the portable transport device station, and a locked position wherein the corresponding one of the plurality of portable transport devices is maintained in the portable transport device station, and a kiosk for moving at least one of the plurality of docking spots between the unlocked and locked positions;
receiving user identification information comprising sensor data automatically captured by one or more sensors at the bicycle station that includes a representation of a user;
analyzing the sensor data to determine a feature vector;
comparing the feature vector to a plurality of stored feature vectors;
determining a stored feature vector from the plurality of stored feature vectors that matches the feature vector to at least a threshold deviation, the stored feature vector associated with a registered user, the registered user associated with a user account of a service provider;
authorizing access to the user account;
triggering a transport mode reservation event in the user account; and
unlocking a first docking spot of the plurality of docking spots with the kiosk to automatically provide access to a first portable transport device of the plurality of shared portable transport devices associated with the transport mode reservation event based at least in part on an automatic authentication procedure when the user is within a signal detection range associated with the portable transport device station.

16. The computer-implemented method of claim 15, wherein the plurality of shared portable transport devices are a plurality of scooters, and wherein the portable transport device station is a scooter station.

* * * * *